June 21, 1932.  C. J. DOERING ET AL  1,864,234

TIRE STAND

Filed Dec. 13, 1929

INVENTORS
Charles J. Doering
William M. Doering
BY Word & Word ATTORNEYS

Patented June 21, 1932

1,864,234

UNITED STATES PATENT OFFICE

CHARLES J. DOERING AND WILLIAM M. DOERING, OF CINCINNATI, OHIO

TIRE STAND

Application filed December 13, 1929. Serial No. 413,897.

This invention relates to supporting devices and is particularly directed to a cradle or stand for supporting a tire casing in upright display position. It is an object of this invention to provide an improved tire casing stand in which the tire casing is quickly and efficiently secured against rotation in the support and which is affixed to the tire casing in such manner as to remain in position when the tire casing is lifted and moved about.

It has been customary in some instances to depend entirely on the weight of the tire cradled between the jaws or pivotally connected elements of the stand for a complete binding or frictional engagement maintaining the tire casing in upright position. The Doering Patent No. 1,284,260 exemplifies the foregoing construction.

Therefore another object of this invention is to provide a tire stand of the type crading the tire casing between pivoted stand sections or jaws which includes an improved clamping means for definitely and positively securing the tire casing in the stand by forcibly urging the jaws together. The improvement is effective toward forcibly drawing the sections of the stand together additionally to the clamping effect induced by the weight of the tire whereby it is impossible for the cradled portion of the tire to rotate in the stand.

Another object is to provide an attaching or clasping means of this nature which is capable of various arrangements depending on the size and shape of the tire casing inserted in the stand.

Another object is to provide in conjunction with the clasp a means for supporting a placard which is extremely adaptable for rapid insertion and positive maintenance of the placard in position for efficient display.

Other objects and further advantages will be more fully set forth in a description of the accompanying drawing, in which.

Figure 1:
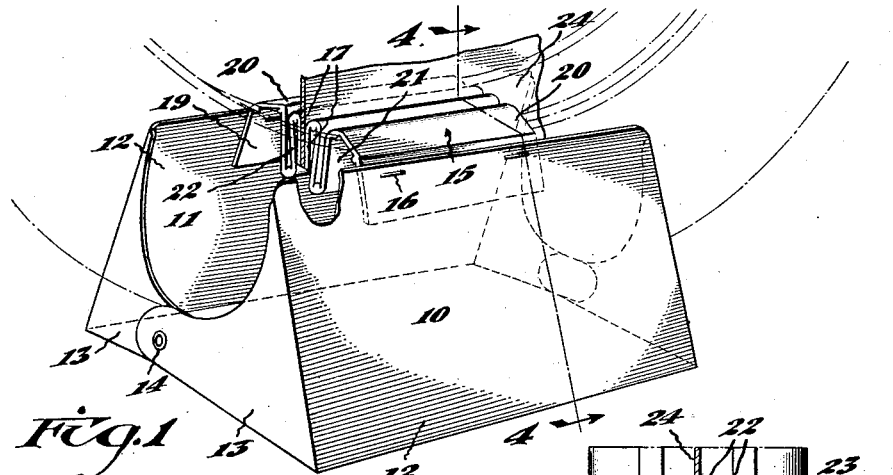
Figure 1 is a perspective view of the improved tire stand showing the tire casing, disposed therein, in phantom lines and illustrating a placard in position.
Figure 2:
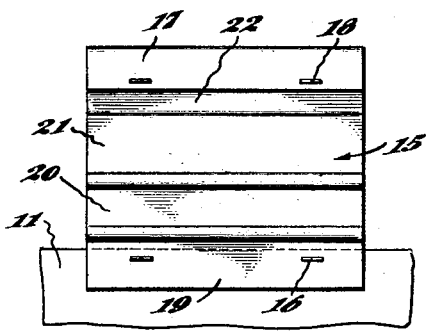
Figure 2 is a fragmentary view of a jaw element of the stand looking from the inside toward the inner face of one of the strap portions of the clamp or clasp, showing it in unfolded position.
Figure 4:
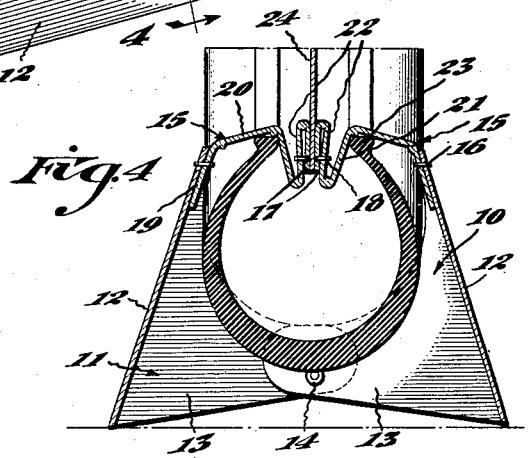
Figure 4 is a sectional view taken on line 4—4, Figure 1 showing the clasp or straps in operative position for clamping a tire within the jaws of the stand, this view illustrating one of the smaller size tires in position.

Generally speaking the stand illustrated, comprises, a pair of pivotally secured elements providing pairs of jaws spaced apart relative to the circumference of the tire, and a clasp or attaching device between the respective stand elements for binding the jaw elements to an inserted tire casing. The principal form of clasp includes straps designed to be tucked or inserted between the beads of the tire casing, each strap having a plurality of folds permitting convenient tucking thereof. The tucking may be varied depending on the size of the tire casing. The tucked portions of the straps frictionally engage between the beads of the tire and provide a clamp for receiving the lower edge of an advertising card mounted within the confines of the tire casing.

Referring to Figures 1 to 5, inclusive, of the drawing, the respective elements of the tire stand are generally indicated at 10 and 11. These elements may be constructed out of paper or metal, the material being of no particular importance in this instance. Each element provides a broad side panel 12, which may be used for advertising, and inwardly extending wings 13 having perforated ends, the adjacent wings of the elements secured together by means of eyelets 14 or other pivotal means disposed within the respective perforations. These elements 10 and 11 are designed to rock on the lower edge of the side wall, the pivotally connected wings being clear of the floor when the wings, which constitute the jaws of the stand, are frictionally engaging the sides of the tire casing, this frictional engagement being induced by the weight of the casing on the pivot portions of the jaws. A strip of cardboard 15 or any other foldable material is attached to each element at the side wall portions thereof. The attachment of these strips is conventional and may be by means of stitching 16 in the case of a cardboard stand or rivets in the instance of a metal stand. These strips extend inwardly toward each other from the intermediate portions of the elements and are therefore disposed centrally of the length of the stand and between the jaws thereof.

The attached lengths of material cooperate as hereinafter described to constitute the clasp heretofore mentioned and may be termed straps. They are plurally folded for flexibility in tucking the same relative to the tire casing. As shown there are four folds in each clasp element. The extreme inner ends of the clasp elements are hemmed and the hems 17 are turned inwardly and properly secured by stitching 18 or any other suitable means.

A fold 19 of each element functions as an attaching portion. This fold is secured to the particular stand section. In the instance of a small tire the next or adjoining fold 20 functions as a draw portion extending between the stand and the bead of the tire. The third and fourth folds namely 21, 22, are folded together and tucked into the opening of the tire between the beads 23—23.

It will readily be seen that when the adjacent double folds of the clasp straps are tucked in together between the beads, the sections of the stand will be urged inwardly and the jaws tightly compressed upon the tire casing. The tucked folds are frictionally engaged since they slightly spread the beads of the tire due to the aggregate thickness of the four folds, or six folds including the hems. This forced spreading of the beads creates a compression force on the tucked folds and maintains them in position.

The particular clasp described has been found to function extremely efficiently since it is attached to a pliable or yieldable element such as a rubber and cord fabricated tire casing. The springiness or elasticity of the tire casing tends to set the clasp firmly in position.

The hemmed edges of the clasp elements being frictionally engaged, the arrangement provides an efficient clamp and for this reason a placard or advertising or display card 24 is inserted therebetween, the card assuming a vertical position within the confines of the tire casing. The binding effect of the clasp not only sets the tire casing firmly in the stand, but achieves the result of securing the stand to the tire casing so that the tire casing may be moved from one position of display to another without arranging the same in the stand each time and without touching or manipulating the stand in any way.

Figure 5:
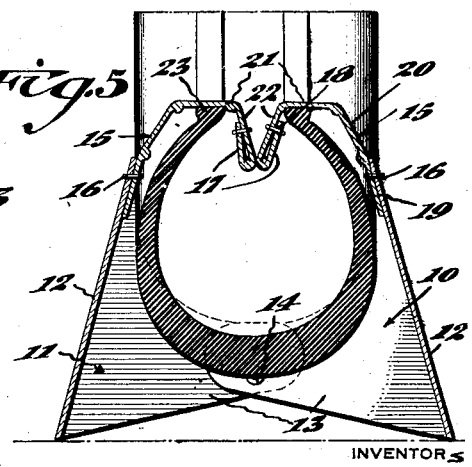
Figure 5 is a sectional view taken similarly to Figure 4 but showing a large size tire mounted in the stand with the clasp arranged in a slightly varied manner.
Figure 3:
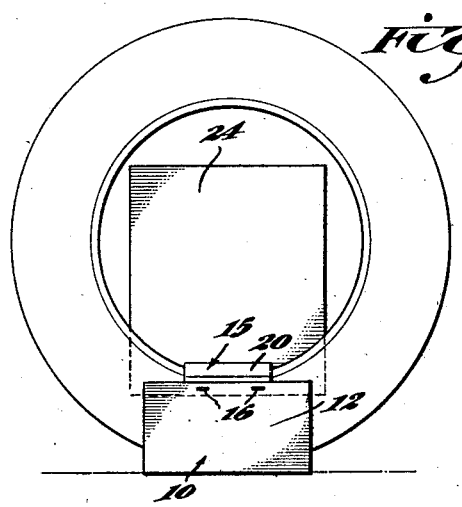
Figure 3 is a side elevation of the stand showing a tire casing and placard mounted therein.

As shown in Figure 5, the third folds 21 of the clasp elements engage across the bead of the tire casing and the extreme inner folds 22 are tucked between the beads of the casing. It is therefore possible to use the same size clasp for various size tires, since the same clamping action is procured and the tucked folds are similarly frictionally engaged for clasping the tire casing in the stand and permitting the arrangement of the placard 24 therebetween.

The attaching device of the present invention has particular utility as an auxiliary or cooperating means for forcibly actuating the jaws of the stand described but is also intended for use in any other type of stand or cradle or where it may function as the sole means for securing the tire casing in the stand.

Having described our invention, we claim:

1. A tire casing stand, comprising, a rectangular frame, said frame open at the top to receive the tire casing, folded extensions disposed inwardly from the sides of the frame, the innermost adjacent folds of the respective extensions introduced into the opening in the tire casing between the beads thereof and frictionally engaged therein, whereby the stand is attached to the tire casing.

2. A tire casing stand, comprising, a frame provided with an open top to receive the tire casing and ends to fit the cross sectional contour of the tire, straps attached to the respective sides of the frame, said straps having their inner ends frictionally engaged within the interior of the casing by tucking the ends therein.

3. A tire casing stand, comprising, spaced pairs of jaws constituted by elements pivotally joined, the upper ends of the jaws adapted to rock inwardly under the weight of a tire casing on the lower portions thereof, plurally folded extensions disposed inwardly from the upper edges of the jaw elements, the innermost adjacent folds of the respective extensions introduced into the opening in the tire casing between the beads thereof and frictionally engaged whereby they are clamped within the tire casing and the jaws of the stand are drawn against the casing walls.

4. A tire casing stand, comprising, spaced pairs of jaws, the jaws of each element constituted by respective elements pivotally joined, a strap attached to each element, said straps having their inner ends frictionally engaged within the interior of the tire casing by tucking the ends therein.

5. A collapsible tire stand, comprising, sections provided with side walls and end walls, the end walls of the sections pivotally connected, said sections adapted to clasp a tire casing disposed within the stand, and a clamping means attached to the respective sections, said means disposed across the beads of the tire casing and adapted to have its adjacent ends tucked between the beads.

6. A tire stand, comprising, a frame having side walls and end walls, said end walls formed to cradle the tire therebetween, straps connected to the respective sides of the frame and said straps foldable for tucking the adjacent ends thereof between the beads of the tire.

In witness whereof, we hereunto subscribe our names.

CHARLES J. DOERING.
WILLIAM M. DOERING.